United States Patent
Shudo

(10) Patent No.: US 6,740,405 B2
(45) Date of Patent: May 25, 2004

(54) LIQUID FORM ADDITION CURING TYPE SILICONE RUBBER COMPOSITION FOR ROLL FORMING

(75) Inventor: Shigeki Shudo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 68 days.

(21) Appl. No.: 10/096,650

(22) Filed: Mar. 14, 2002

(65) Prior Publication Data

US 2002/0132914 A1 Sep. 19, 2002

(30) Foreign Application Priority Data

Mar. 15, 2001 (JP) .......................... 2001-074414

(51) Int. Cl.$^7$ .................. B32B 25/20; B32B 27/28; C08L 83/05; C08L 83/07

(52) U.S. Cl. .................. 428/391; 428/364; 428/375; 428/421; 428/447; 428/450; 524/588; 492/56; 525/478; 528/15; 528/31; 528/32

(58) Field of Search .................. 428/364, 375, 428/391, 421, 447, 450; 525/478; 524/588; 399/279; 492/56; 528/15, 31, 32

(56) References Cited

U.S. PATENT DOCUMENTS

| | | | |
|---|---|---|---|
| 4,659,621 A | * 4/1987 | Finn et al. | 428/339 |
| 5,645,942 A | * 7/1997 | Sutoh | 428/447 |
| 5,770,298 A | * 6/1998 | Nakamura et al. | 428/195 |
| 6,090,887 A | 7/2000 | Nakamura et al. | |
| 6,111,221 A | 8/2000 | Miyakoshi et al. | |
| 6,231,954 B1 | 5/2001 | Yoshida et al. | |
| 6,328,682 B1 | 12/2001 | Shudo et al. | |
| 6,545,076 B2 | * 4/2003 | Kaiya et al. | 524/268 |

FOREIGN PATENT DOCUMENTS

| | | | |
|---|---|---|---|
| EP | 763568 A2 | * 3/1997 | C08L/83/04 |
| JP | 9-165515 | 6/1997 | |

OTHER PUBLICATIONS

U.S. patent application Ser. No. 10/115,241, filed Apr. 4, 2002, Pending.
U.S. patent application Ser. No. 10/096,650, filed Mar. 14, 2002, Pending.

* cited by examiner

Primary Examiner—Jeffrey B. Robertson
(74) Attorney, Agent, or Firm—Oblon, Spivak, McClelland, Maier & Neustadt, P.C.

(57) ABSTRACT

A liquid form addition curing type silicone rubber composition for roll forming purposes is provided which displays excellent stability and little variation in viscosity over time at room temperature, and yet also offers excellent curability at high temperature. The composition includes:

(a) 100 parts by weight of an organopolysiloxane with at least two alkenyl groups bonded to non-terminal silicon atoms within the molecular chain of each molecule, (b) 1 to 300 parts by weight of an inorganic filler, (c) an effective quantity of a platinum based catalyst, and (d) an organohydrogenpolysiloxane represented by the general formula (2),

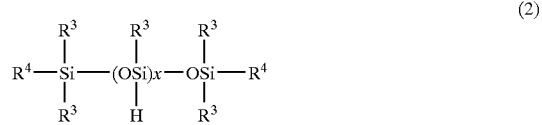

(2)

wherein, $R^3$ represents an unsubstituted or a halogen-substituted monovalent hydrocarbon group with no aliphatic unsaturated double bonds, each $R^4$ represents, independently, either an unsubstituted or a halogen-substituted monovalent hydrocarbon group with no aliphatic unsaturated double bonds, or a hydrogen atom, and x represents an integer of 2 or greater, with at least two silicon atom-bonded hydrogen atoms within a single molecule, in sufficient quantity to produce a molar ratio of silicon atom-bonded hydrogen atoms within the constituent (d) relative to the alkenyl groups within the constituent (a) of 0.1 to 5.

24 Claims, No Drawings

LIQUID FORM ADDITION CURING TYPE SILICONE RUBBER COMPOSITION FOR ROLL FORMING

BACKGROUND OF THE INVENTION

1. Field of the Invention

The present invention relates to a liquid form addition curing type silicone rubber composition for forming rollers used in devices such as copiers, laser printers and facsimiles. Specifically, the present invention relates to a liquid form addition curing type silicone rubber composition for forming the roller used as a fixing roller, a developing roller or a paper supply roller in the above devices, and particularly to a liquid form addition curing type silicone rubber composition which displays good stability and undergoes almost no variation in viscosity at room temperature, and yet displays excellent curability at high temperature, as well as a roller comprising a layer of a silicone rubber elastic body formed from such a composition provided around the periphery of a metal core.

2. Description of the Prior Art

Liquid form addition curing type silicone rubber compositions are widely used for the fixing rollers, developing rollers and paper supply rollers used in devices such as copiers, laser printers and facsimiles. The reason for their use is that in comparison with other rubber materials, silicone rubber displays superior properties of releasability relative to toner, heat resistance and compression set. The formation of this type of roller usually involves either separating the constituents of the liquid form addition curing type silicone rubber composition into two parts, mixing them separately in a static mixer, and then combining the two parts at the time of use, or alternatively mixing all of the constituents together using the screw rotation action of a dynamic mixer. The thus obtained mixed product is then injected into a roll forming mold, cured under heat, and the cured roller then removed from the mold.

However, the time taken from preparation of the composition through to completion of the filling of the roll forming mold is considerably longer than typical injection molding, and because the mixed silicone rubber composition gradually begins to cure even at room temperature, problems such as thickening of the composition and gelling within the mold increase the likelihood of an unsatisfactory molding process. As a result, a composition which offers good stability and very little variation in viscosity over time at room temperature has been keenly sought. In contrast, once injected into the mold, the silicone rubber composition also needs to cure promptly under heating.

SUMMARY OF THE INVENTION

The present invention is the result of intensive research aimed at resolving the issues described above, and has an object of providing a liquid form addition curing type silicone rubber composition for roll forming purposes which displays little variation in viscosity at room temperature, and yet displays excellent curability at high temperature.

The inventors of the present invention discovered they could achieve this object with a liquid form addition curing type silicone rubber composition for roll forming purposes comprising:

(a) 100 parts by weight of an organopolysiloxane with at least two alkenyl groups bonded to non-terminal silicon atoms within the molecular chain of each molecule;

(b) 1 to 300 parts by weight of an inorganic filler;

(c) an effective quantity of a platinum based catalyst; and (d) an organohydrogenpolysiloxane represented by a general formula (2),

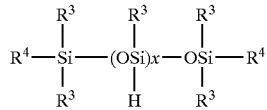

(2)

wherein, $R^3$ represents an unsubstituted or a halogen-substituted monovalent hydrocarbon group with no aliphatic unsaturated double bonds, each $R^4$ represents, independently, either an unsubstituted or a halogen-substituted monovalent hydrocarbon group with no aliphatic unsaturated double bonds or a hydrogen atom, and x represents an integer of 2 or greater, with at least two silicon atom-bonded hydrogen atoms (in other words, SiH groups) within a single molecule, in a sufficient quantity to produce a molar ratio of silicon atom-bonded hydrogen atoms within the constituent (d) relative to the alkenyl groups bonded to silicon atoms within the constituent (a) of 0.1 to 5.

DETAILED DESCRIPTION OF THE PREFERRED EMBODIMENTS

As follows is a more detailed description of the present invention. First, each of the constituents of a silicone rubber composition of the present invention are described.

Constituent (a): Organopolysiloxane

Constituent (a), which is one of the essential constituents of a composition of the present invention, is an organopolysiloxane with at least two alkenyl groups bonded to non-terminal silicon atoms within the molecular chain (in other words, alkenyl groups bonded to the silicon atoms of bifunctional siloxane units (i.e., diorganosiloxane units) or trifunctional siloxane units (i.e., organosilasesquioxane units) represented by the formulas $R_2SiO_{2/2}$ or $RSiO_{3/2}$ (wherein R is an unsubstituted or halogen-substituted monovalent hydrocarbon group, as described below) to form so-called pendent substituent groups). The molecular structure of this organopolysiloxane should preferably be essentially a straight chain, although a molecular structure with some minor branching is also acceptable.

This organopolysiloxane should preferably be of a structure represented by a general formula (1) shown below.

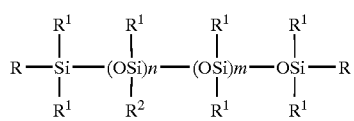

(1)

(wherein, R represents an unsubstituted or halogen-substituted monovalent hydrocarbon group, $R^1$ represents an unsubstituted or a halogen-substituted monovalent hydrocarbon group with no aliphatic unsaturated double bonds, $R^2$ represents an alkenyl group, n represents an integer of 2 or greater, and m represents 0, or an integer of 1 or greater).

Suitable examples of the unsubstituted or halogen-substituted monovalent hydrocarbon groups represented by R in the general formula (1) typically include hydrocarbon groups of 1 to 10, and preferably 1 to 6, carbon atoms, including alkyl groups such as methyl groups, ethyl groups, propyl groups, isopropyl groups, butyl groups, isobutyl groups, tert-butyl groups, pentyl groups, hexyl groups and cyclohexyl groups; alkenyl groups such as vinyl groups, allyl groups, propenyl groups and butenyl groups; aryl groups such as phenyl groups, tolyl groups and xylyl groups; aralkyl groups such as benzyl groups and phenylethyl groups; and halogenated alkyl groups such as 3-chloropropyl groups and 3,3,3-trifluoropropyl groups. Suitable $R^1$ groups include the same unsubstituted or halogen-substituted monovalent hydrocarbon groups mentioned above but excluding those groups with aliphatic unsaturated double bonds such as the alkenyl groups including vinyl groups and allyl groups. Amongst the groups listed above, both the R groups and the $R^1$ groups should preferably be methyl groups. The $R^2$ groups represent alkenyl groups such as vinyl groups, allyl groups, propenyl groups and butenyl groups. n represents an integer of 2 or greater, and m represents either 0, or an integer of 1 or greater, and m+n is typically an integer of 20 to 2000, and preferably an integer of 50 to 1000. Furthermore, n/(m+n) should preferably be a number from 0.001 to 0.2, with values from 0.002 to 0.1 being particularly preferred.

The viscosity of the constituent (a) at 25° C. should preferably be at least 1000 mPa·s (milliPascal·seconds), with values within a range from 1000 to 1,000,000 mPa·s being particularly preferred.

Specific examples of the constituent (a) include copolymers of dimethylsiloxane and methylvinylsiloxane with both terminals blocked with trimethylsiloxy groups, copolymers of dimethylsiloxane and methylvinylsiloxane with both terminals blocked with dimethylvinylsiloxy groups, copolymers of methylvinylsiloxane and diphenylsiloxane with both terminals blocked with trimethylsiloxy groups, copolymers of methylvinylsiloxane and diphenylsiloxane with both terminals blocked with dimethylvinylsiloxy groups, copolymers of dimethylsiloxane, methylvinylsiloxane and diphenylsiloxane with both terminals blocked with trimethylsilyl groups, copolymers of dimethylsiloxane, methylvinylsiloxane and diphenylsiloxane with both terminals blocked with dimethylvinylsiloxy groups, and copolymers of methylvinylsiloxane and methylphenylsiloxane with both terminals blocked with trimethylsilyl groups. These copolymers may be used singularly, or in combinations of two or more different copolymers.

Constituent (b): Inorganic Filler

The inorganic filler used as the constituent (b) of the present invention is used to ensure a predetermined hardness and to impart physical strength such as tensile strength to the composition on curing. Examples of suitable inorganic fillers include hydrophilic or hydrophobic fumed silica (dry process silica), precipitated silica (wet process silica), crystalline silica and quartz powder, and these materials may be used singularly, or in combinations of two or more different materials. From the viewpoint of reinforcement, the fumed silica and the precipitated silica should have a BET specific surface area of 50 to 500 m²/g, and preferably 100 to 400 m²/g, and from the viewpoint of factors such as adhesion durability with the fluororesin layer during the formation of the roller, the crystalline silica and the quartz powder should have an average particle diameter of 0.5 to 10 μm, with values from 1 to 5 μm being particularly preferred.

Specific examples of commercially available materials which satisfy these requirements include hydrophilic silica products with brand names such as Aerosil 130, 200, 300 (manufactured by Nippon Aerosil Co., Ltd. and Degussa Co., Ltd.), Cabosil MS-5, MS-7 (manufactured by Cabot Corporation), Rheorosil QS-102, 103 (manufactured by Tokuyama Corporation) and Nipsil LP (manufactured by Nippon Silica Industrial Co., Ltd.), hydrophobic silica products with brand names such as Aerosil R-812, R-812S, R-972, and R-974 (manufactured by Degussa Co., Ltd.), Rheorosil MT-10 (manufactured by Tokuyama Corporation) and the Nipsil SS series of products (manufactured by Nippon Silica Industrial Co., Ltd.), and crystalline silica products with brand names such as Crystallite, Mimusil and Imisil.

The amount of the inorganic filler of the constituent (b) used is typically within a range from 1 to 300 parts by weight of the filler per 100 parts by weight of the constituent (a), with amounts from 5 to 200 parts by weight being particularly preferred. At amounts less than 1 part by weight, the mechanical strength of the silicone rubber deteriorates, and the roller may rupture on removal from the mold. In contrast, at amounts exceeding 300 parts by weight, the compression set of the silicone rubber falls, making it less effective as a roller.

Constituent (c): Platinum Based Catalyst

The platinum based catalyst of the constituent (c) of the present invention promotes the curing addition reaction (hydrosilylation) between the aforementioned constituent (a) and the constituent (d). This platinum based catalyst may utilize any platinum or platinum compound known to promote such addition reactions. Specific examples include platinum black, chloroplatinic acid, alcohol modified products of chloroplatinic acid, and complexes of chloroplatinic acid with olefins, aldehydes, vinyl siloxanes or acetylene alcohol compounds. This catalyst is used in quantities which offer effective catalytic action (so-called catalytic quantity), although the actual amount added may be increased or reduced depending on the curing speed required. Typically, platinum quantities of 0.1 to 1000 ppm are used relative to the amount of the constituent (a), and quantities from 1 to 200 ppm are preferred.

Constituent (d): Organohydrogenpolysiloxane

The organohydrogenpolysiloxane of the constituent (d) of the present invention has the functions of curing the composition and suppressing variations in viscosity. This organohydrogenpolysiloxane has a structure represented by the general formula (2) shown above (namely, a straight chain structure in which the principal chain comprises repeating organohydrogensiloxane units and the two molecular chain terminals are blocked with either triorganosiloxane groups or diorganohydrogensiloxane groups), with at least two silicon atom-bonded hydrogen atoms (in other words, SiH groups) within a single molecule.

In the general formula (2), $R^3$ represents an unsubstituted or a halogen-substituted monovalent hydrocarbon group with no aliphatic unsaturated double bonds, and in the same manner as the group $R^1$ described above, incorporates those monovalent hydrocarbon groups described for the group R of the general formula (1) but excluding alkenyl groups. Specific examples include alkyl groups such as methyl groups, ethyl groups, propyl groups, butyl groups, and pentyl groups; aryl groups such as phenyl groups, tolyl groups and xylyl groups; and halogenated alkyl groups such as 3-chloropropyl groups and 3,3,3-trifluoropropyl groups, although methyl groups are particularly preferred. $R^4$ represents either an unsubstituted or a halogen-substituted monovalent hydrocarbon group with no aliphatic unsaturated double bonds, or a hydrogen atom, and examples of suitable monovalent hydrocarbon groups include the same groups described above for the group $R^3$. X represents an integer of 2 or greater, with integers within a range from 5 to 1000 being preferred. Integers within the range from 5 to 100 are even more desirable.

The viscosity of the constituent (d) at 25° C. should preferably be within a range from 3 to 10,000 mPa·s, with values within the range from 3 to 300 mPa·s being particularly preferred.

Specific examples of the organohydrogenpolysiloxane of the constituent (d) include methylhydrogenpolysiloxane with both molecular chain terminals blocked with dimethylhydrogensiloxy groups, methylhydrogenpolysiloxane with both molecular chain terminals blocked with phenyldimethylsiloxy groups, and methylhydrogenpolysiloxane with both molecular chain terminals blocked with trimethylsiloxy groups, and these organohydrogenpolysiloxane compounds may be used singularly, or in combinations of two or more compounds.

The constituent (d) is used in a quantity which produces a molar ratio of silicon atom-bonded hydrogen atoms (SiH groups) within the constituent (d) relative to the alkenyl groups bonded to silicon atoms within the constituent (a) within a range from 0.1 to 5, and molar ratios within the range from 0.4 to 3 are particularly desirable. If the molar ratio of silicon atom-bonded hydrogen atoms within the constituent (d) relative to the alkenyl groups within the constituent (a) is less than 0.1, then the cured product may not be sufficiently cured, whereas at molar ratios exceeding 5, increases in viscosity are likely at room temperature, leading to molding difficulties, and there is also an increased danger of gas bubbles forming inside the silicone rubber.

Other Constituents

In order to improve the practical applications of compositions of the present invention, where necessary, various other additives may also be included in such compositions.

In those cases in which the curing time needs to be regulated, retarding agents may be used, and suitable examples include vinyl group containing organopolysiloxanes such as vinylcyclotetrasiloxane, as well as triallylisocyanurate, alkylmaleate, acetylene alcohols and silane or siloxane modified products thereof, hydroperoxides, tetramethylethylenediamine, benzotriazol, and mixtures thereof.

Furthermore, non-reinforcing fillers such as diatomaceous earth and calcium carbonate, coloring agents including organic dyes or inorganic pigments such as cobalt blue, and reagents for improving the heat resistance or flame resistance such as cerium oxide, zinc carbonate, manganese carbonate, titanium oxide and carbon black may also be added.

Roller Production

A silicone rubber roller of the present invention is produced via a series of steps described below.

First, the constituents of a composition of the present invention are either separated into two parts, mixed separately in a static mixer and the two parts then combined, or alternatively all mixed together using the screw rotation action of a dynamic mixer, and the resulting mixture is injected into a roll forming mold with a static metal core which has already undergone primer treatment. The mixture is then cured under heat to form a liquid form silicone rubber covering around the periphery of the metal core, and the roller is then released from the mold. In addition, where necessary a fluorine based latex coating may also be sprayed onto the surface of the released roller, and the coating layer then sintered at high temperature.

In another production method, a roller is formed by first subjecting the internal surface of a tetrafluoroethylene perfluoroalkyl ether (PFA) tube or a polyimide tube to primer treatment, and then injecting an uncured composition of the present invention into the space between a primer treated metal core and the tetrafluoroethylene perfluoroalkyl ether (PFA) tube or polyimide tube, while heat curing is also performed.

In yet another production method, a mixed liquid form addition curing type silicone rubber composition is injected into a roll forming mold with a static metal core which has already undergone primer treatment, the roll forming mold is set in a compression device, and the composition is then cured under heat, a liquid form silicone rubber covering is formed around the periphery of the metal core, and the roller is then released from the mold.

The metal core used in production of the roller may be any one of a variety of materials such as steel, aluminum and stainless steel. Furthermore, a primer treated metal core may also be used. The fluorine based latex coating and the fluorine based resin tubes or polyimide based resin tubes described above may utilize commercially available products, although for the fluorine based resin tubes, tetrafluoroethylene perfluoroalkyl ether (PFA) tubes are preferred, and the surface which contacts the silicone rubber should preferably be treated by either corona discharge or by other treatments which improve the contact with silicone rubber such as sodium naphthalene methods, sputter etching methods or liquid ammonia methods. In addition, primer treatment may also be used to improve the contact durability.

EXAMPLES

As follows is a description of specifics of the present invention using a series of examples. However, the present invention is in no way limited to the examples presented. In the examples below, Pa·s refers to units of "Pascal·seconds".

Example 1

100 parts by weight of a straight chain dimethylsiloxane polymer (with a degree of polymerization of approximately 700) with both molecular chain terminals blocked with trimethylsiloxy groups and with an average of approximately 5 side chain vinyl groups incorporated within each molecule as methylvinylsiloxane units, 10 parts by weight of Aerosil R-972 (manufactured by Degussa Co., Ltd.) as a dry process silica (fumed silica), 50 parts by weight of a crystalline silica (brand name: Crystallite 5X) with an average particle diameter of 1.5 μm, and 0.1 parts by weight of a cyclic methylvinylpolysiloxane represented by a formula (i) shown below were mixed together uniformly.

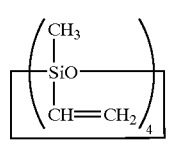

(i)

Subsequently, 3.0 parts by weight of a methylhydrogenpolysiloxane represented by a formula (ii) shown below with both molecular chain terminals blocked with trimethylsiloxy groups,

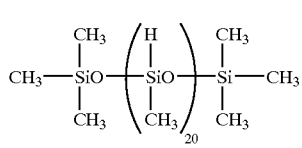

(ii)

0.1 parts by weight of 1-ethynyl-1-cyclohexanol as a reaction retarding agent, and sufficient quantity of a platinum vinylsiloxane complex to provide 50 ppm of platinum metal were added to the mixture and mixed well to produce a uniform silicone rubber composition 1.

The following measurements were then performed on the silicone rubber composition 1.

(1) Viscosity:

The viscosity of the composition at room temperature (25° C.) was measured using a rotational viscometer, and revealed a value of 270 Pa·s.

(2) Curability:

Measurement of the curability at 150° C. using a rheometer yielded values of $T_{10}$ 24 seconds, and $T_{90}$ 68 seconds. ($T_{10}$ and $T_{90}$ represent the curing times taken for the composition to reach 10% and 90% respectively of the maximum torque value as measured by the rheometer at completion of curing of the composition.)

(3) Moldability

The silicone rubber composition 1 was injected into a roll forming mold with a static metal core which had previously undergone primer treatment. The composition was allowed to sit in the mold at room temperature for one week, and was subsequently cured under heat at 120° C. for one hour, before the roller was released from the mold.

(4) Viscosity Variation Over Time

The viscosity of the composition (at 25° C.) was measured following one week standing at room temperature, using the same method as in (1) above, and revealed a value of 280 Pa·s.

(5) Curability Variation Over Time

The curability of the composition was measured following one week standing at room temperature, using the same method as in (2) above, and yielded values of $T_{10}$ 24 seconds, and $T_{90}$ 68 seconds.

Comparative Example 1

A silicone rubber composition 2 was prepared in the same manner as the example 1, with the exception that 3.0 parts by weight of an organohydrogenpolysiloxane represented by a formula (iii) shown below was used instead of the organohydrogenpolysiloxane represented by the aforementioned formula (ii).

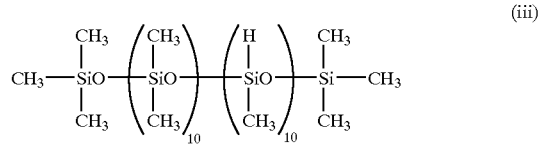

(iii)

The silicone rubber composition 2 was subjected to the same measurements as described for the example 1, and produced the following results.
(1) Viscosity: 260 Pa·s
(2) Curability: $T_{10}$ 23 seconds, $T_{90}$ 65 seconds
(3) Moldability: The silicone rubber composition was mixed together in the same manner as the example 1, and the mixture was then injected into a roll forming mold with a static metal core which had previously undergone primer treatment, and was subsequently allowed to sit for three days at room temperature. The composition gelled within the mold.

Comparative Example 2

A silicone rubber composition 3 was prepared in the same manner as the example 1, with the exception that 3.0 parts by weight of an organohydrogenpolysiloxane represented by a formula (iv) shown below was used instead of the organohydrogenpolysiloxane represented by the aforementioned formula (ii).

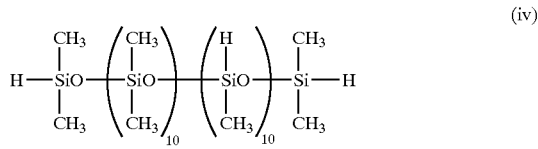

(iv)

The silicone rubber composition 3 was subjected to the same measurements as described for the example 1, and produced the following results.
(1) Viscosity: 260 Pa·s
(2) Curability: $T_{10}$ 24 seconds, $T_{90}$ 64 seconds
(3) Moldability: The silicone rubber composition was mixed together in the same manner as the example 1, and the mixture was then injected into a roll forming mold with a static metal core which had previously undergone primer treatment, and was subsequently allowed to sit for two days at room temperature. The composition gelled within the mold.

Comparative Example 3

A silicone rubber composition 4 was prepared in the same manner as the example 1, with the exception that 3.0 parts by weight of an organohydrogenpolysiloxane represented by a formula (v) shown below was used instead of the organohydrogenpolysiloxane represented by the aforementioned formula (ii).

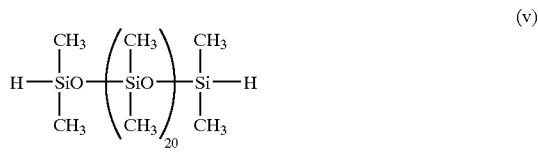

(v)

The silicone rubber composition 4 was subjected to the same measurements as described for the example 1, and produced the following results.
(1) Viscosity: 260 Pa·s
(2) Curability: $T_{10}$ 22 seconds, $T_{90}$ 62 seconds
(3) Moldability: The silicone rubber composition was mixed together in the same manner as the example 1, and the mixture was then injected into a roll forming mold with a static metal core which had previously undergone primer treatment, and was subsequently allowed to sit for one day at room temperature. The composition gelled within the mold.

A liquid form addition curing type silicone rubber composition of the present invention displays excellent stability at room temperature, and undergoes almost no variation in viscosity. Despite this room temperature stability, the composition also displays excellent curability on heating. As a result, the composition is well suited for the various rollers used within devices such as electrical photocopiers and the like.

What is claimed is:

1. A liquid form addition curing type silicone rubber composition for roll forming purposes consisting essentially of:
   (a) 100 parts by weight of an organopolysiloxane with at least two alkenyl groups bonded to non-terminal silicon atoms within a molecular chain of each molecule, (b) 1 to 300 parts by weight of an inorganic filler,
(c) an effective quantity of a platinum based catalyst, and
(d) an organohydrogenpolysiloxane represented by a general formula (2),

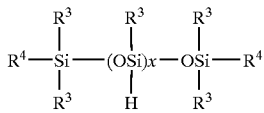

(2)

wherein, $R^3$ represents either one of an unsubstituted and a halogen-substituted monovalent hydrocarbon group with no aliphatic unsaturated double bonds, each $R^4$ represents, independently, any one of an unsubstituted and a halogen-substituted monovalent hydrocarbon group with no aliphatic unsaturated double bonds, and a hydrogen atom, and x represents an integer of 2 or greater, with at least two silicon atom-bonded hydrogen atoms within a single molecule, in sufficient quantity to produce a molar ratio of silicon atom-bonded hydrogen atoms within said constituent (d) relative to said alkenyl groups bonded to silicon atoms within said constituent (a) of 0.1 to 5.

2. A composition according to claim 1, wherein said organopolysiloxane of said constituent (a) is represented by a general formula (1),

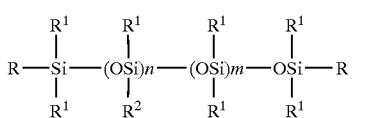

(1)

wherein, R represents either one of an unsubstituted and a halogen-substituted monovalent hydrocarbon group, $R^1$ represents either one of an unsubstituted and a halogen-substituted monovalent hydrocarbon group with no aliphatic unsaturated double bonds, $R^2$ represents an alkenyl group, n represents an integer of 2 or greater, and m represents either one of 0, and an integer of 1 or greater.

3. A composition according to claim 2, wherein in said general formula (1), each R represents, independently, any one of an alkyl group, an alkenyl group, an aryl group, an aralkyl group and a halogenated alkyl group of 1 to 10 carbon atoms, each $R^1$ represents, independently, any one of an alkyl group, an aryl group, an aralkyl group and a halogenated alkyl group of 1 to 10 carbon atoms, and each $R^2$ represents, independently, any one of a vinyl group, an allyl group, a propenyl group and a butenyl group.

4. A composition according to claim 3, wherein in said general formula (1), each R and each $R^1$ represents a methyl group.

5. A composition according to claim 2, wherein in said general formula (1), m+n represents an integer of 20 to 2000, and n/(m+n) is a number within a range from 0.001 to 0.2.

6. A composition according to claim 1, wherein the viscosity at 25° C. of said organopolysiloxane of said constituent (a) is at least 1,000 mPa·s.

7. A composition according to claim 6, wherein the viscosity at 25° C. of said organopolysiloxane of said constituent (a) is within a range from 1,000 to 1,000,000 mPa·s.

8. A composition according to claim 1, wherein said inorganic filler of said constituent (b) is hydrophilic fumed silica, hydrophobic fumed silica, precipitated silica, crystalline silica, quartz powder, or a combination thereof.

9. A composition according to claim 1, further comprising a reaction retarding agent, a non-reinforcing filler, a coloring agent, a reagent for improving heat resistance and flame resistance, or a combination thereof.

10. A cured product obtained by curing a composition according to claim 1.

11. A roller comprising a metal core, and a silicone rubber elastic body formed from a cured product of a composition according to claim 1, formed around a periphery of said metal core.

12. A roller according to claim 11, wherein a surface mold releasing layer formed from a fluorine based latex, a fluorine based resin, or a combination thereof, is provided around a periphery of said silicone rubber elastic body.

13. A liquid form addition curing type silicone rubber composition for roll forming purposes comprising:
(a) 100 parts by weight of an organopolysiloxane with at least two alkenyl groups bonded to non-terminal silicon atoms within a molecular chain of each molecule,
(b) 1 to 300 parts by weight of an inorganic filler,
(c) an effective quantity of a platinum based catalyst, and an organohydrogenpolysiloxane,
said organohydrogenpolysiloxane consisting of (d) an organohydrogenpolysiloxane represented by a general formula (2),

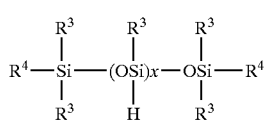

(2)

wherein, $R^3$ represents either one of an unsubstituted and a halogen-substituted monovalent hydrocarbon group with no aliphatic unsaturated double bonds, each $R^4$ represents, independently a halogen-substituted monovalent hydrocarbon group with no aliphatic unsaturated double bonds, and a hydrogen atom, and x represents an integer of 2 or greater, with at least two silicon atom-bonded hydrogen atoms within a single molecule in sufficient quantity to produce a molar ratio of silicon atom-bonded hydrogen atoms within said constituent (d) relative to said alkenyl groups bonded to silicon atoms within said constituent (a) of 0.1 to 5.

14. A composition according to claim 13, wherein said organopolysiloxane of said constituent (a) is represented by a general formula (1),

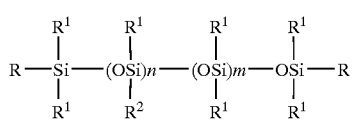

(1)

wherein, R represents either one of an unsubstituted and a halogen-substituted monovalent hydrocarbon group, $R^1$ represents either one of an unsubstituted and a halogen-substituted monovalent hydrocarbon group with no aliphatic unsaturated double bonds, $R^2$ represents an alkenyl group, n represents an integer of 2 or greater, and m represents either one of 0, and an integer of 1 or greater.

15. A composition according to claim 14, wherein in said general formula (1), each R represents, independently, any one of an alkyl group, an alkenyl group, an aryl group, an aralkyl group and a halogenated alkyl group of 1 to 10 carbon atoms, each $R^1$ represents, independently, any one of an alkyl group, an aryl group, an aralkyl group and a halogenated alkyl group of 1 to 10 carbon atoms, and each $R^2$ represents, independently, any one of a vinyl group, an allyl group, a propenyl group and a butenyl group.

16. A composition according to claim 15, wherein in said general formula (1), each R and each $R^1$ represents a methyl group.

17. A composition according to claim 14, wherein in said general formula (1), m+n represents an integer of 20 to 2000, and n/(m+n) is a number within a range from 0.001 to 0.2.

18. A composition according to claim 13, wherein the viscosity at 25° C. of said organopolysiloxane of said constituent (a) is at least 1,000 mPa·s.

19. A composition according to claim 18, wherein the viscosity at 25° C. of said organopolysiloxane of said constituent (a) is within a range from 1,000 to 1,000,000 mPa·s.

20. A composition according to claim 13 wherein said inorganic filler of said constituent (b) is hydrophilic fumed silica, hydrophobic fumed silica, precipitated silica, crystalline silica, quartz powder, or a combination thereof.

21. A composition according to claim 13 further comprising a reaction retarding agent, a non-reinforcing filler, a coloring agent, a reagent for improving heat resistance and flame resistance, or a combination thereof.

22. A cured product obtained by curing a composition according to claim 13.

23. A roller comprising a metal core, and a silicone rubber elastic body formed from a cured product of a composition according to claim 13 formed around a periphery of said metal core.

24. A roller according to claim 23, wherein a surface mold releasing layer formed from a fluorine based latex, fluorine based resin, or a combination thereof, is provided around a periphery of said silicone rubber elastic body.

* * * * *